United States Patent [19]
Lovejoy

[11] Patent Number: 5,646,354

[45] Date of Patent: Jul. 8, 1997

[54] MICROWAVE THERMAL TRACE FLOWMETER

[75] Inventor: Kim A. Lovejoy, Waukesha, Wis.

[73] Assignee: Lovejoy Controls Corporation, Waukesha, Wis.

[21] Appl. No.: 540,182

[22] Filed: Oct. 6, 1995

[51] Int. Cl.[6] .................................................. G01F 1/68
[52] U.S. Cl. .................................. 73/861.95; 73/861.05
[58] Field of Search ........................ 73/861.05, 861.06, 73/861.95; 324/301, 306, 637

[56] References Cited

U.S. PATENT DOCUMENTS

| | | | |
|---|---|---|---|
| 4,458,709 | 7/1984 | Springer | 73/861.05 |
| 4,629,987 | 12/1986 | King et al. | 73/861.05 |
| 5,526,696 | 6/1996 | Cappi | 73/861.95 |

*Primary Examiner*—Richard Chilcot
*Assistant Examiner*—Harshad Patel
*Attorney, Agent, or Firm*—Ryan, Maki, Mann & Hohenfeldt, S.C.

[57] ABSTRACT

A flowmeter is based on the principle of injecting a pulse of microwave radiation into a flowing stream of material containing a substance having an absorption band for the radiation so as to heat a small quantity of the substance and continue its flow in a conduit to a downstream temperature sensor where the temperature of the quantity is sensed for enabling determination of the time elapsed for the quantity to travel from the point at which the microwave energy is injected to the sensor. A microcontroller receiving signals from the sensor determines when the peak temperature of the quantity is sensed and uses the peak to terminate measurement of a time interval. The time interval starts when the microcontroller senses that the ac sinusoidal power has passed through zero at which time the microwave generator, such as a magnetron, emits a pulse of microwave radiation for heating the quantity of the substance of the material flowing in the conduit. The microprocessor uses the known distance between where the microwave energy is injected, the cross sectional area of the conduit, and the duration of the time for the heated quantity of the substance to reach the temperature sensor to calculate the volumetric flow of the material in the conduit. The microcontroller transmits the results of the calculation in terms of digital numbers to various remote flow rate display devices.

19 Claims, 3 Drawing Sheets

MICROWAVE THERMAL TRACE FLOWMETER

BACKGROUND OF THE INVENTION

The invention disclosed herein pertains to improvements in flowmeters.

It is well known that there are a variety of preexisting flowmeters based on various principles of operation such as ultrasound technology and rotationally driven turbines or vanes. Existing flowmeters have been found to be satisfactory and accurate for metering the volume flow rate of a fluidic material that is flowing in a conduit at a fairly high velocity provided the material is of uniform density. There are installations where a material is flowing so slowly that existing flowmeters are incapable of metering the flow volume with acceptable accuracy. Turbine and vane type flowmeters are especially problematical when the flowing material contains solids that foul or block the turbine or vane. One example of where it is important to measure low flow rates with high precision is in plants that generate electricity based on utilization of nuclear energy. In some cases several feeder pipes or conduits feed or drain into a common sump where it is important to know the quantity of fluid material that is being fed to the sump from each of several sources. There many other situations where there is a need for an instrument that is capable of measuring the flow rate of materials flowing at low velocity.

SUMMARY OF THE INVENTION

An objective of the invention disclosed herein is to provide a system for accurately measuring the flow rates of fluidic materials that are flowing at low velocity and high velocity too.

Briefly stated, in accordance with the invention, the flow of a fluidic material flowing in a conduit is measured accurately by utilizing a microwave radiation generator, such as a magnetron, and a thermal sensor. The microwave generator is coupled to a conduit that is filled with flowing fluidic material for the microwave generator to inject pulses of microwave radiation into the flowing material. Absorption of the microwave energy causes a quantity of a substance in the material, such as water, to be heated above its present or inherent temperature. This quantity of material flows downstream from where the microwave energy excites its molecules to transit a thermal sensor. The thermal sensor, which has been sensing the inherent temperature of the material continuously, responds by a signal value increase as the warmed quantity of the material or a substance in the material transits the sensor. For example, the material could be a slurry of solids and the material could be water. A microcontroller is used to initiate measuring a time interval coincident with injection of a microwave radiation pulse into the flowing stream. The microcontroller then determines the peak temperature of the quantity having passed the sensor and uses that information to determine the end of the time interval measurement. The size of the conduit, the distance between the place of microwave energy injection and the sensor are known parameters by reason of design. The time that it takes for the thermally activated quantity to travel from the place of microwave energy injection to the sensor is determined by the microcontroller. Having the distance between the microwave injection point and the sensor position known and the travel time of the quantity determined, permits the microcontroller to calculate the flow velocity. Since the conduit area is known and velocity is determined, all of the data that are necessary for the microcontroller to determine the volume of the fluid material that is flowing per unit of time are known. The results of the determination are then displayed remotely.

A specific feature of the system is to have the secondary winding of a transformer coupled to the microwave generator which is preferably a magnetron. The primary winding of the transformer is coupled to an alternating current power source through a zero-crossing switch. The switch is in a nonconductive state until it is closed by a signal from the microcontroller. The microcontroller then senses when the next zero crossing occurs and at the same time the primary winding of the transformer is energized so a pulse of microwave energy is injected and measurement of the time interval begins. The zero-crossing switch is continuously coupled through an opto-coupler to an input of the microcontroller for the controller to be able to sense when the alternating current wave passes through zero. The peak temperature of the quantity of heated material is obtained by the microcontroller using the signal information from the thermal sensor which provides for the microcontroller to monitor the temperature of the heated quantity during the rise and fall of the temperature of the material above the inherent temperature as the heated quantity transits the thermal sensor. Thus, as mentioned above, the one unknown factor, namely, the time for the heated quantity of material to travel from the place of microwave energy injection to the thermal sensor becomes known and all information is available for the microcontroller to calculate the flow quantity and produce a signal representing it.

The system can meter the flow of a large variety of materials such as water containing large proportions of solids and materials, such as concrete aggregate containing little water and a large proportion of solids. When water is the substance that is to be heated with microwave energy, the flowing material should preferably contain 25% or more of water. The system can also meter the volumetric flow rate of other fluent materials provided the microwave generator frequency is selected to correspond to a spectral absorption band of the material or a substance therein.

How the foregoing objectives and features of the new metering system are achieved and implemented will appear in the following more detailed description of a preferred embodiment of the invention which will now be set forth in reference to the drawings.

DESCRIPTION OF A PREFERRED EMBODIMENT

Figure 1:
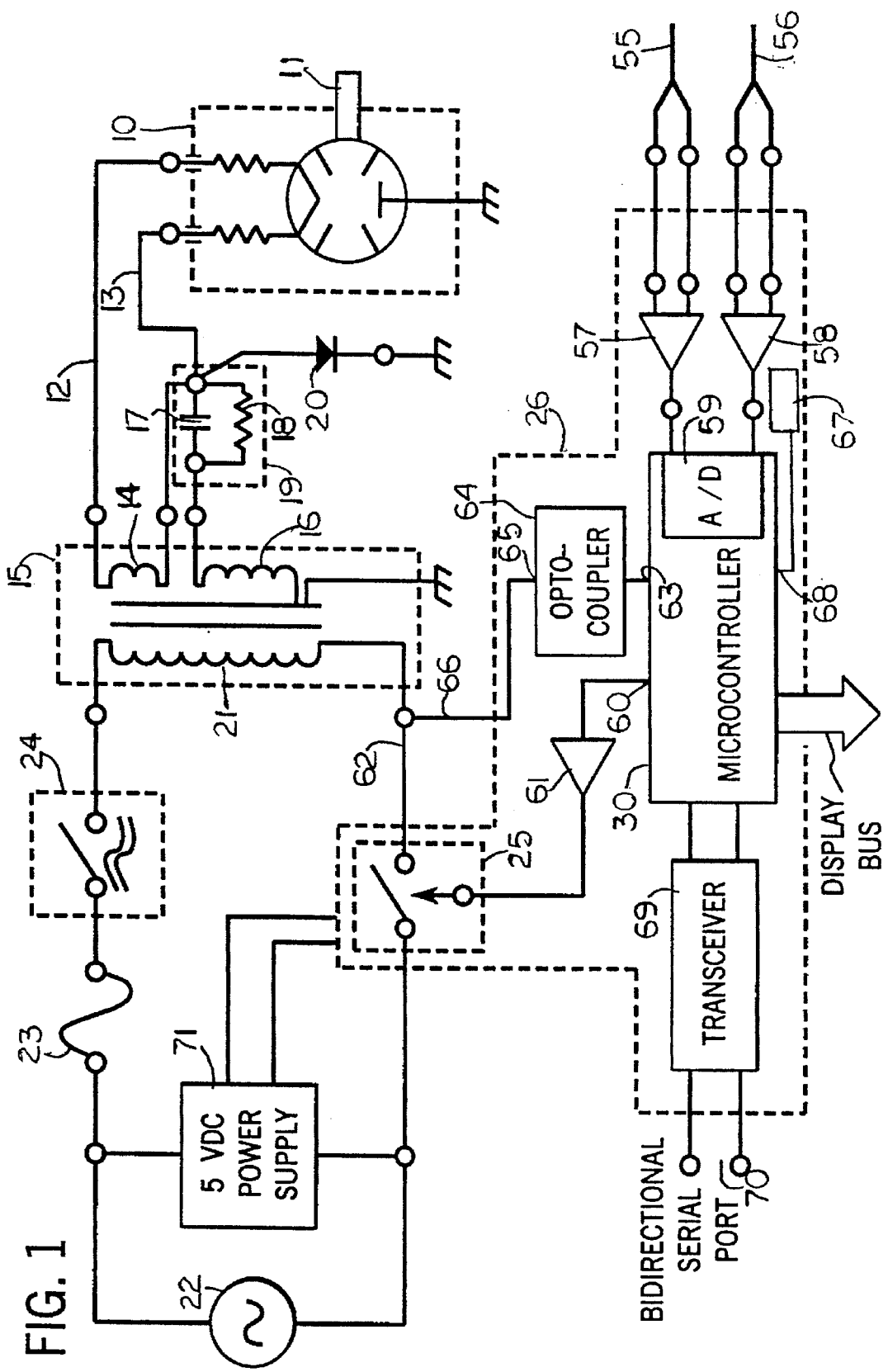
FIG. 1 is block diagram of the new flow metering system.

In the right region of FIG. 1, a microwave generator, particularly a magnetron, is symbolized and represented within a dashed line rectangle marked 10. The magnetron is provided with a waveguide tube 11 through which pulses of microwave energy are injected into a material flowing within a conduit where the flow rate or volume per unit time of the material is to be determined and displayed. The magnetron has electric power infeed conductors 12 and 13 which are connected to a secondary winding 14 of a transformer that is shown within a dashed line rectangle 15. The transformer has another secondary winding 16 which, as shown, is connected in a circuit including a capacitor 17 and a resistor 18 which are enclosed in a dashed line rectangle 19 and comprise in conjunction with a diode 20 a voltage doubling circuit.

The primary winding 21 of transformer 15 is connected to an alternating current source 22 which supplies a voltage at the level of the building mains such as about 120 volts ac. One side of the primary winding 21 is connected to ac source 22 through a circuit including a fuse 23 and a thermal overload protective switch represented symbolically in a dashed line rectangle marked 24 and another end of primary winding 21 is connected to ac source 22 through a zero-crossing switch that is symbolized within a rectangle marked 25. The zero-crossing switch is shown as mounted on a control circuit board defined by the dashed lines marked 26. In an actual embodiment of the invention, the zero-crossing switch used has a 120 vac, 10 ampere rating with a TTL or CMOS control input. The switch used is the Type JTA2410-2 of the CP Clare Corporation although equivalent switches of other vendors may be used.

In an actual embodiment of the system, the transformer 15 has a 120 volt ac primary, and a 2000 volt ac secondary that has split secondary windings. The transformer used is an Emerson Electric Co. part No. S0306. Equivalent transformers are available from other vendors. The voltage rating of the transformer depends on the magnetron that is to be used and the output frequency of the chosen microwave generator depends on the wavelength of the principal absorption band of the material or a particular material which one wants to heat with the microwave energy. In an actual embodiment of the metering system, for example, the substance desired to be excited to a higher temperature was water whose principal absorption band is 2450 MHZ.

The high voltage capacitor 17 is a 1 micro-farad capacitor having a voltage rating higher than twice transformer secondary voltage rating. The capacitor utilized in an actual embodiment of the system is an Emerson Electric Co. Part No. S0172. The high voltage resistor 18 has a value of about 9 megohms and a wattage rating matched to the power requirements of the magnetron 10. The silicon rectifier diode 20 used in an actual embodiment has an inverse voltage rating of about 5000 volts. The diode used was obtained from Emerson Electric Co. and is identified by its part No. G0407 although equivalent diodes are obtainable from other vendors. Upon energization of the transformer primary coil 21, the split secondary coils 14 and 16 of the transformer provide both filament current and high voltage of approximately 2000 volts ac to the magnetron. The 2000 volts is rectified and furthermore effectively voltage-doubled by the combination of a circuit containing capacitor 17, high voltage resistor 18 and the diode 20 which is connected to ground. Each time the alternating current source 22 waveform passes through zero following successive closures of zero-crossing switch 25, magnetron 10 becomes energized for a sufficient time for the magnetron to develop 2540 MHZ microwave radiation, which is transmitted through tubular waveguide 11 and injected into the material flowing through a conduit as will be elaborated shortly hereinafter.

Figure 2:
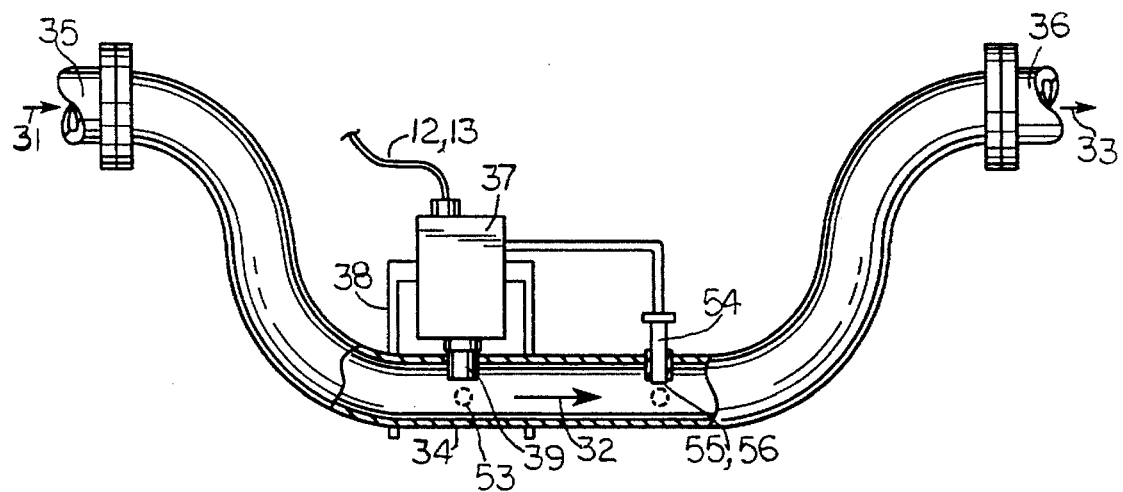
FIG. 2 illustrates how the microwave injection point and the thermal sensing point along the fluidic material flow path are positioned on a section of the conduit that is shaped to be assuredly filled with liquid.
Figure 3:
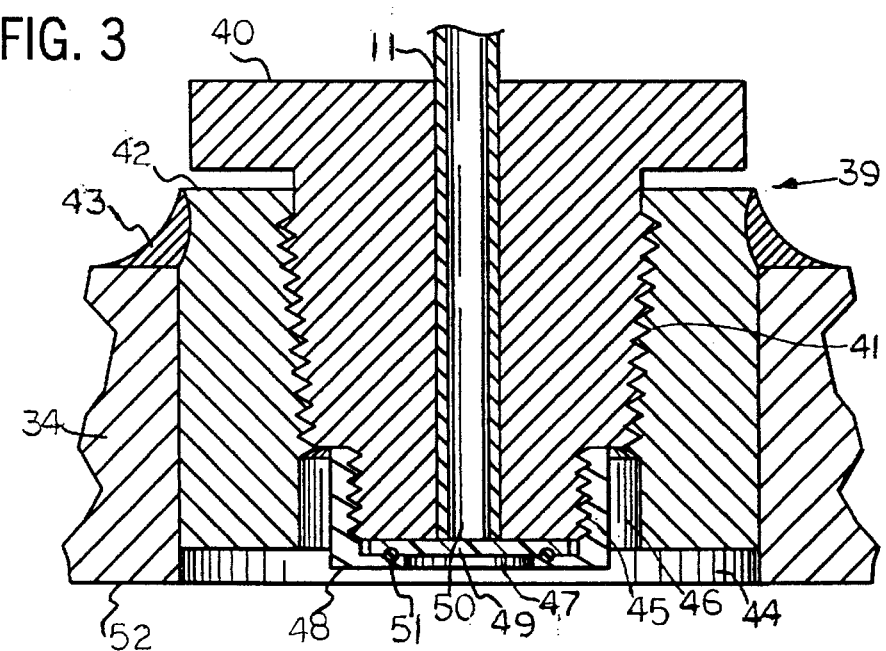
FIG. 3 shows in cross section the means by which the output of the microwave generator is coupled to the conduit that is conducting the flowing material.

Attention is now invited to FIG. 2 where the fluidic material being metered is flowing in a conduit in the direction indicated by the arrows 31, 32 and 33. The conduit has an offset providing a section 34 that is below the level of the conduit sections 35 and 36 so that there is an assurance that conduit section 34 will be filled over its entire cross sectional area with the flowing material. FIG. 2 shows a housing 37 which, among other circuit elements contains microwave generator 10. Housing 37 is supported on conduit section 34 by means of bracket members 38. The magnetron, particularly waveguide 11, extends through a coupling assembly that is generally designated by the numeral 39 and couples the microwave generator to the conduit section 34. An enlargement of the coupling assembly 39 is shown in section in FIG. 3 where the waveguide tube 11 is shown extending coaxially through a plug member 40 which has an external thread 41 for screwing into the corresponding internal thread in a coupling element 42 which is fastened to conduit section 34 by suitable means such as the welding fillet marked 43. Cylindrical member 42 fits through a hole 44 in conduit section 34. The lower end of plug 40 is provided with an external thread 45 onto which a ferrule 46 screws. The ferrule has a central opening 47 defined by the margins of an annular shoulder 48 which provides for securing a microwave transparent plastic window 49 against the bottom open end 50 of the waveguide tube 50. An O-ring 51 is interposed between the annular shoulder 48 of the ferrule and the microwave transmissive window disk to effect a liquid tight seal. It should be noted that the open end 50 of waveguide 11 terminates rather close to the inside surface 52 of the conduit section 34 where laminar flow of the flowing material is more likely but accurate measurements are obtained when flow is turbulent too. In FIG. 2, the quantity of a substance, such as water, that has its temperature increased above its inherent temperature which prevails before microwave radiation exposure is represented by a small circle in marked 53 marked in FIG. 2. A heated quantity of a substance, such as water, in the material flowing in the conduit is created by every pulse of microwave energy emitted from waveguide tube 11. The successive quantities of heated substance travel in the direction of the arrow 32 for transiting the lower end of an adapter or coupling 54 by means of which thermal sensors, such as the two sensors 55 and 56 in FIG. 1, are exposed to the material flowing in the conduit. The distance between the waveguide tube 11 outlet and the downstream sensor or sensors and coupling member 54 is known. The cross sectional area of the conduit section 34 is also known. Thus the only parameter or data to be determined in order to measure the velocity of the material flowing in the conduit is the time that it takes for a heated quantity 53 of a substance to travel from the place where the microwave radiation is injected into the quantity to where the temperature of the quantity is sensed. The conductors 12 and 13 shown in FIG. 1 for supplying the magnetron tube 10 are within a cable running from the sensor to component housing 37.

Figure 4:
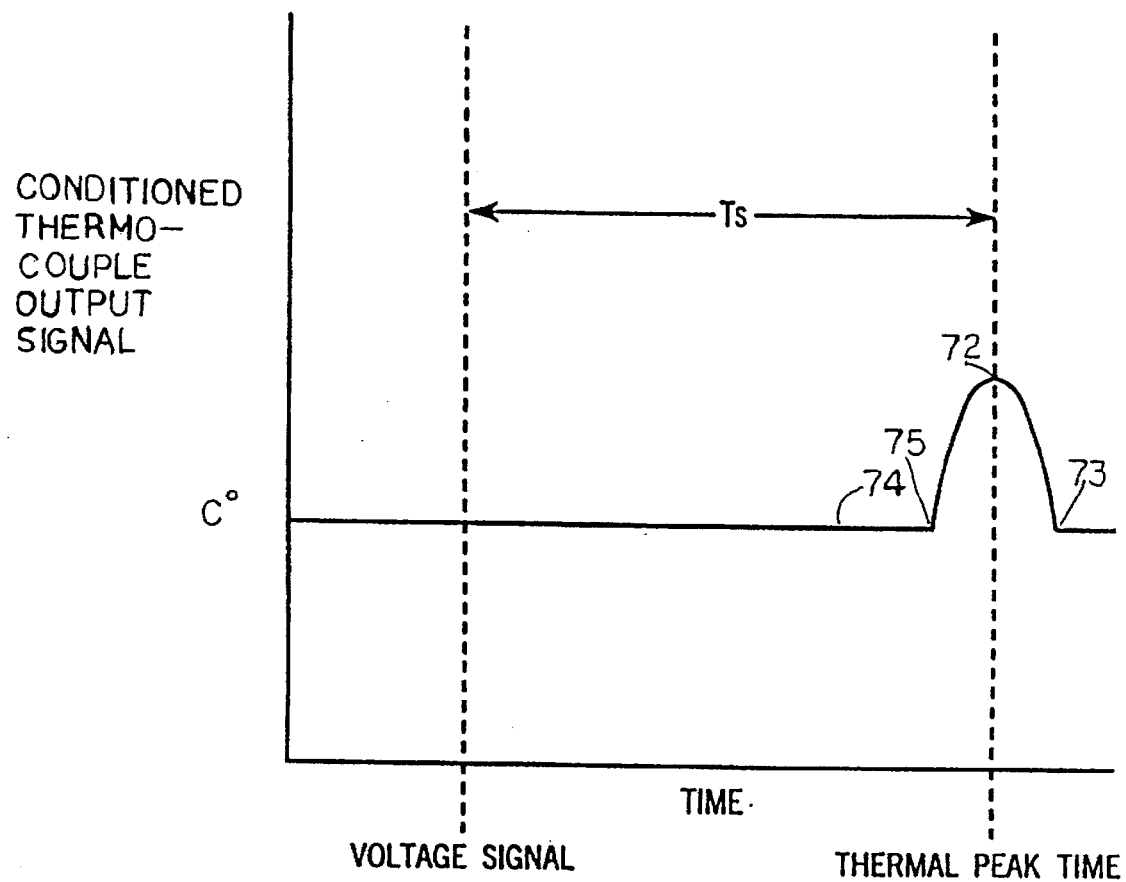
FIG. 4 is a timing diagram that is useful for explaining in detail the operating mode of the system.

In FIG. 1, two temperature sensors are shown and are marked 55 and 56. In most installations only one sensor is required. A sensor is positioned in the coupling member in FIG. 2 so that it is near the inside surface of the conduit wall. There are certain installations where flow velocity is relatively low at some times and higher at other times. In such cases, one thermal sensor may be positioned farther downstream from where the microwave radiation is injected and the farther of the sensors is read out by the microcontroller for the higher flow rate. In an actual embodiment, an infrared sensitive Type-E thermocouple having an 80 ms response time was used. The thermocouple is Omega Engineering Model No. OS36-E-80F. Thermocouples having a fast response time obtained from other vendors could also be used. The analog signal variations from the thermal sensors 55 and 56 are input to signal conditioning amplifiers 57 and 58. These are instrumentation amplifiers. The output of the one or the other of the amplifiers 57 and/or 58 are input to an analog-to-digital converter 59 which may be on board microcontroller 30 or may be a free standing integrated circuit device, not shown. In any case, the digitized output of the converter, representing instantaneous bolus temperature, is utilized by the microcontroller to determine: the peak temperature sensed, the travel time of the heated quantity of the substance from microwave energy injection to the sensor, and then to compute the flow velocity and the total flow per unit time using the known distance between the microwave injection and sensor and the known cross sectional area of the conduit. The reference point for the microcontroller to start measuring a time interval is when the sinusoidal ac is fed to the primary winding 21 of transformer 15 passes through zero. As indicated previously, this is determined after the microcontroller 30 sends out a signal that switches the zero-crossing switch 25 to a conductive state. The microcontroller has an output 60 coupled to the input of a buffer 61. During operation of the flowmeter, the microcontroller is continuously issuing, from output 60, control signals at uniform periodicity. Each time a signal is coupled through buffer 61 to the zero-crossing switch 25, the switch changes to a conductive state and energizes primary winding 21. Coincident with this event, but followed by a known short time delay, magnetron 10 starts to issue microwave radiation pulses. A sensing or voltage logic line 66 couples the output line 62 from zero-crossing switch 25 to an input 63 of the microcontroller through an opto-coupler 64. The voltage at the input 65 of the opto-coupler may be around 2000 volts and the voltage from the output which is fed to input 63 of the microcontroller will be at digital logic level such as 5 volts. The microcontroller, through the opto-coupler in the sensing line 66, responds to the first zero voltage appearing on line 62 that occurs after the zero-crossing switch goes into a conductive state and, at this time, the microcontroller begins counting pulses produced by an internal clock, not shown. Counting starts substantially coincident with emission of microwave radiation through waveguide 11 into a quantity of the substance in the material flowing in the conduit. The microcontroller continues measuring time before and during the time that the heated quantity of the substance in the flowing material transits the sensor. The microcontroller stops counting when it receives a signal from a thermal sensor 55, for example, that is indicative of the small quantity of a substance in the flowing material transiting the sensor. The point at which the timing interval begins is labeled "voltage signal" in the FIG. 4 timing diagram. This signal is coincident with occurrence of a zero crossing by the sinusoidal ac circuit driving voltage. After a microwave radiation pulse is injected into the substance, the temperature of the substance sensed by a sensor 55, for example, is initially the inherent temperature of the flowing material as represented by the corresponding analog signal level 70 which is output from the signal conditioning amplifier 57. As one may see in FIG. 4, there is a temperature distribution across the microwave heated quantity which results in the output signal from amplifier 57 rising at time 71 when the quantity begins transiting the thermal sensor, reaches a peak at 72 and declines to the inherent temperature level 73 which is representative of the temperature to which the sensor was exposed before the microwave radiation pulse was injected. The whole temperature range of the heated quantity during transit time is stored in on-board memory on the microcontroller chip and the microcontroller rapidly determines the thermal peak time which constitutes the end of the timing interval Ts. A dual in-line (DIP) switch, such as the one marked 67, is mounted to control board 26 and is connected to an input 68 of microcontroller 30. The DIP switch is operable to enter data that particularizes the metering system to an expected flow velocity range, conduit size and the distance of the thermal sensors from the point where microwave radiation is injected into the substance of the material flowing in a conduit. The benefit of this is that it avoids the necessity of reprogramming the microcontroller for every unique installation of the metering equipment.

The system includes a transceiver 69 which has a bidirectional serial port for transmitting digital data into microcontroller 30 and for conducting digital data from the microcontroller. An RS-485 transceiver has been used.

FIG. 1 shows a dc output power supply 71 whose output is connected symbolically to the control board 26 for supplying the digital logic level voltage to the various electronic devices used in the system. The microcontroller used in an actual embodiment is a Motorola HC11E9 unit with an internal 8 bit with on-board analog-to-digital converter, input ports and output ports for precision timing application. Other suitable microcontrollers are available from various manufacturers.

Although an embodiment of the new microwave flowmeter has been described in sufficient detail for those skilled in the art to reproduce it, such description is intended to be illustrative rather than limiting, for the invention may be variously embodied and is to be limited only by construing the claims which follow.

I claim:

1. A method of measuring the flow velocity of a flowing stream of a fluidic material containing a substance, comprising:

injecting a pulse of microwave radiation into the flowing material at a point upstream to heat a quantity of the substance to a temperature above its inherent temperature and initiating measurement of a time interval coincident with the pulse, having a temperature sensor at a point downstream that is at a known distance from said upstream point for the sensor to continually sense the inherent temperature of the substance and effect termination of said time interval in response to the heated quantity of the substance passing over the sensor, and using the known distance between upstream and downstream points, and the duration of the time interval to the compute the flow velocity of the substance.

2. A method according to claim 1 wherein said substance is water and said material contains at least about 25% of water, the microwave radiation having a frequency of about 2450 MHZ to heat the water.

3. A method according to claim 1 wherein the frequency of said microwave radiation corresponds to the principal absorption spectral band of the substance.

4. A method according to claim 1 including:

having a material containing said substance flowing in a conduit of known cross sectional area with the material filling the entire cross sectional area of the conduit, and using said known distance between upstream and downstream points to determine the duration of the time interval and the cross sectional area of the conduit to determine the flow volume of the substance.

5. A method of measuring the volume flow rate of a flowing fluidic material flowing in a conduit with the material containing a substance, comprising:

having a microwave generator coupled to said conduit for injecting microwave radiation into the material at its inherent temperature at an upstream point to heat a quantity of the substance and initiate measurement of a time interval coincident with said injecting said microwave radiation, having a temperature sensor at a point downstream from said upstream point continually producing a signal representing the inherent temperature of the unheated substance as it passes the sensor and producing a signal representing the temperature of the heated quantity of the substance as the heated quantity transits the sensor, having the secondary windings of a transformer coupled to said microwave generator and the primary winding of the transformer coupled to an ac source through a zero-crossing switch, having a microcontroller receiving said signals from said sensor and continuously counting clock pulses for determining the length of said time interval, said microcontroller enabling said zero-crossing switch to conduct for energizing said microwave generator and responding to a zero crossing of the waveform of said ac occurring by energizing said microwave source to inject said microwave radiation into said substance, having said microcontroller programmed to terminate said time interval at a time corresponding to when the peak temperature of said quantity of the substance transiting said sensor is sensed, and then having said microcontroller use the length of the time interval and the distance between said points to compute the flow velocity and use the flow velocity and the area of the conduit to compute the volume flow rate.

6. A method according to claim 5 having said substance be water and having the frequency of said microwave radiation be substantially 2450 MHz.

7. A method according to claim 5 wherein said material contains water as the substance and there is at least 25% of water in the material and the frequency of said microwave radiation is substantially 2450 MHZ.

8. A system for measuring the volume flow rate of a flowing fluidic material, comprising:

a conduit through which said material having an inherent temperature flows, a microwave radiation generator coupled to said conduit for injecting a pulse of microwave radiation into said material at an upstream position for a quantity of a substance in said material to be heated by absorption of microwave energy a transformer having primary and secondary windings and means coupling said secondary winding to said microwave radiation generator, means coupling said primary winding to an ac source including a zero-crossing switch having an output in a circuit with said primary winding, a thermal sensor coupled to said conduit downstream at a known distance from said upstream position for producing a signal value representative of the inherent temperature of the substance and for producing a signal of a different value in response to transit of said sensor by the material including the quantity of the microwave heated substance, a programmable microcontroller having signal input means and signal output means and means coupling said sensor to an input means, means coupling an output means of said microcontroller to said zero-crossing switch for controlling said switch to switch to a conductive state for activating said microwave radiation generator, a circuit coupling an input of said microcontroller to the output of the zero-crossing switch for signaling said microcontroller to initiate a time measuring interval coincident with occurrence of a zero crossing after said switch switches to said conductive state and to terminate said measuring interval in response to said signal from said thermal sensor indicating that said heated quantity of the substance is transiting said sensor, means for entering data into said micro-controller including data representing the cross sectional area of said conduit and the distance between said upstream position where the microwave radiation is injected and the downstream position of said thermal sensor for said microcontroller to utilize said distance, duration of said time interval, and the area of said conduit to compute the rate of flow of material in said conduit and produce a signal representative of said rate, and circuit means for transmitting said last named signal from an output of the microcontroller for display of said rate of flow.

9. A system according to claim 8 wherein said circuit coupling said output of the zero-crossing switch to an input of said microcontroller includes an opto-coupler.

10. A system according to claim 8 wherein said means for entering data into said microcontroller comprises at least one DIP switch having an output coupled to an input of said microcontroller.

11. A system according to claim 8 wherein said substance in said material is water and the frequency of said microwave radiation is substantially 2450 MHZ.

12. A system according to claim 8 wherein said thermal sensor is an infrared radiation responsive thermocouple.

13. A system according to claim 8 wherein said microcontroller is programmed to determine the peak temperature of the temperature distribution over said heated quantity of said substance transiting said sensor and to terminate said interval when said peak temperature is determined.

14. A system according to any one of claims 8, 9, 10, 11, 12 and 13 wherein said microwave radiation generator is a magnetron.

15. A system according to claim 14 wherein said conduit has a vertically deflected section that assures said conduit is completely filled with said flowing material and said microwave generator and thermal sensor are coupled to said conduit within said section.

16. A system according to claim 14 wherein said conduit is configured to provide a section that is completely filled with said flowing material and said microwave generator and said thermal sensor are coupled to said conduit within said section.

17. A system according to any one of claims 8, 9, 10, 11, 12 and 13 wherein said conduit has a deflected section that assures said conduit is completely filled with said flowing material and said microwave generator and thermal sensor are coupled to said conduit within said section.

18. A system according to any one of claims 8, 9, 10, 11, 12 or 13 wherein said conduit is configured to provide a section that is completely filled with said flowing material and said microwave generator and said thermal sensor are coupled to said conduit within said section.

19. A system according to any one of claims 8, 9, 10, 11, 12 and 13 wherein said microwave generator is a magnetron having a waveguide tube extending therefrom for injecting microwave radiation into said conduit, coupling means for coupling said magnetron to said conduit and including a threaded element fixed to said conduit and a threaded plug adapted for screwing into said threaded element with said waveguide tube extending coaxially through said plug and with an end opening of said waveguide tube proximate to the interior of said conduit, a microwave transmissive window arranged over said end opening and an annular retainer element adapted for screwing on to said plug to retain said window at least nearly flush with the interior of said conduit, and means for coupling said sensor to said conduit with said sensor extending into said conduit.

* * * * *

UNITED STATES PATENT AND TRADEMARK OFFICE
CERTIFICATE OF CORRECTION

PATENT NO.    :  5,646,354

DATED         :  July 8, 1997

INVENTOR(S)   :  Kim A. Lovejoy

It is certified that error appears in the above-identified patent and that said Letters Patent is hereby corrected as shown below:

Column 6, Line 36   After "flowing" insert --- fluidic ---
Column 6, Line 49   before compute  delete "the"
Column 8, Line 42   After "12" delete "and" and substitute --- or ---
Column 8, Line 55   After "12" delete "and" and substitute --- or ---
Column 8, Line 65   After "12" delete "and" and substitute --- or ---

Signed and Sealed this

Fourteenth Day of April, 1998

Attest:

BRUCE LEHMAN

*Attesting Officer*              *Commissioner of Patents and Trademarks*